(12) United States Patent
Lee et al.

(10) Patent No.: US 11,050,046 B2
(45) Date of Patent: Jun. 29, 2021

(54) ELECTRODE SLURRY COATING APPARATUS AND METHOD

(71) Applicant: LG Chem, Ltd., Seoul (KR)

(72) Inventors: Taek Soo Lee, Daejeon (KR); Cheol Woo Kim, Daejeon (KR); Sang Hoon Choy, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/615,021

(22) PCT Filed: Dec. 14, 2018

(86) PCT No.: PCT/KR2018/015925
§ 371 (c)(1),
(2) Date: Nov. 19, 2019

(87) PCT Pub. No.: WO2019/135507
PCT Pub. Date: Jul. 11, 2019

(65) Prior Publication Data
US 2020/0185696 A1 Jun. 11, 2020

(30) Foreign Application Priority Data
Jan. 8, 2018 (KR) .................... 10-2018-0002266

(51) Int. Cl.
*H01M 4/04* (2006.01)
(52) U.S. Cl.
CPC ......... *H01M 4/043* (2013.01); *H01M 4/0404* (2013.01)
(58) Field of Classification Search
CPC ...... B05D 1/305; B05D 1/265; B29C 64/209; B29C 64/20; B29C 48/00; B29C 47/00;
(Continued)

(56) References Cited

U.S. PATENT DOCUMENTS 4,313,980 A 2/1982 Willemsens
4,976,999 A * 12/1990 Ishizuka ................. B05C 5/007
118/410
(Continued)

FOREIGN PATENT DOCUMENTS

CN 103056066 A 4/2013
JP S55139865 A 11/1980
(Continued)

OTHER PUBLICATIONS

International Search Report from PCT/KR2018/015925, dated Jul. 11, 2019, pp. 1-4.
(Continued)

*Primary Examiner* — Tabassom Tadayyon Eslami
(74) *Attorney, Agent, or Firm* — Lerner, David, Littenberg, Krumholz & Mentlik, LLP

(57) ABSTRACT

The present invention relates to an electrode slurry coating apparatus comprising a lower die applying electrode slurry on a collector, an intermediate die, an upper die, a first discharge part primarily applying the electrode slurry on the collector to form a first coating layer; an intermediate pressing part pressing the first coating layer to adjust a thickness of the first coating layer; a second discharge part secondarily applying the electrode slurry on a surface of the first coating layer to form a second coating layer; and an upper pressing part pressing the first coating layer and the second coating layer, which are stacked, at the same time to adjust a thickness of each of the first coating layer and the second coating layer, wherein the first discharge part has a width less than that of the second discharge part.

12 Claims, 10 Drawing Sheets

(58) Field of Classification Search
CPC ....... B05C 5/0254; B05C 5/00; B05C 5/0291; B05C 5/0262; B05C 5/0266; B05C 5/027; D05D 1/00
USPC .......................................................... 427/420
See application file for complete search history.

(56) References Cited

U.S. PATENT DOCUMENTS

| | | | |
|---|---|---|---|
| 5,922,408 | A | 7/1999 | Nakama et al. |
| 2002/0023584 | A1 | 2/2002 | Mandai et al. |
| 2011/0287171 | A1 | 11/2011 | Seo et al. |
| 2012/0251726 | A1* | 10/2012 | Kuniyasu .................. B05C 9/06 427/372.2 |

FOREIGN PATENT DOCUMENTS

| | | | |
|---|---|---|---|
| JP | H09223499 | A | 8/1997 |
| JP | H09276770 | A | 10/1997 |
| JP | 2934186 | B2 | 8/1999 |
| JP | 2001-345096 | | * 12/2001 |
| JP | 2001345096 | A | 12/2001 |
| JP | 2002018340 | A | 1/2002 |
| JP | 2003112101 | A | 4/2003 |
| JP | 3848519 | B2 | 11/2006 |
| JP | 2007196164 | A | 8/2007 |
| JP | 2007265698 | A | 10/2007 |
| JP | 2008198596 | A | 8/2008 |
| KR | 20110128589 | A | 11/2011 |
| KR | 20170105752 | A | 9/2017 |

OTHER PUBLICATIONS

Extended European Search Report including Written Opinion for Application No. EP18898753.1 dated Jun. 5, 2020, 7 pages.
Chinese Search Report for Application No. 201880030348.1, dated Sep. 29, 2020, pp. 1-3.

* cited by examiner

| EXPERIMENT | WIDTH(mm) (DISCHARGE WIDTH) | | COATING WIDTH(mm) | | (FIRST COATING LAYER - SECOND COATING LAYER) |
|---|---|---|---|---|---|
| | FIRST DISCHARGE PART | SECOND DISCHARGE PART | FIRST COATING WIDTH | SECOND COATING WIDTH | |
| 1 | 220 | 220 | 223 | 226 | 3 |
| 2 | 221 | 220 | 224 | 226 | 2 |
| 3 | 221 | 219 | 224 | 225 | 1 |
| 4 | 221 | 218 | 224 | 224 | 0 |

FIG.5

ELECTRODE SLURRY COATING APPARATUS AND METHOD

CROSS-REFERENCE TO RELATED APPLICATIONS

The present application is a national phase entry under 35 U.S.C. § 371 of International Application No. PCT/KR2018/015925, filed Dec. 14, 2018, which claims priority from Korean Patent Application No. 10-2018-0002266, filed on Jan. 8, 2018, the disclosures of which are hereby incorporated by reference in their entirety.

TECHNICAL FIELD

The present invention relates to an electrode slurry coating apparatus and method, and more particularly, to an electrode slurry coating apparatus and method, which are capable of adjusting widths of coating layers that are applied to be multilayered on a collector to match each other.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly in which electrodes and separators are alternately stacked and a case accommodating the electrode assembly, and the electrode assembly has a structure in which the plurality of electrodes and the plurality of separators are alternately stacked.

Also, each of the electrodes comprises a collector and a coating layer formed on a surface of the collector. That is, the coating layer of the electrode is formed by applying electrode slurry on the surface of the collector through an electrode slurry coating apparatus.

In recent years, the electrode slurry may be applied at the same width on the surface of the collector through the electrode slurry coating apparatus to form coating layers stacked to be multilayered. Thus, the coating layers may be more uniformly adjusted in thickness.

However, the electrode slurry coating apparatus applies pressing force to the multilayer-stacked coating layers to push the multilayer-stacked coating layers so as to form the multilayer-stacked coating layers having the uniform load or thickness. As a result, the widths may gradually increase from the uppermost layer to the lowermost layer to cause coating defects.

DISCLOSURE OF THE INVENTION

Technical Problem

The present invention has been made to solve the above problems, and an object of the present invention is to provide an electrode slurry coating apparatus and method, which are capable of adjusting widths of coating layers that are applied to be multilayered on a collector to match each other, thereby preventing coating defects from occurring.

Technical Solution

To achieve the above object, an electrode slurry coating apparatus according to a first embodiment of the present invention, which comprises a lower die applying electrode slurry on a collector, an intermediate die, and an upper die, may comprise: a first discharge part disposed between the lower die and the intermediate die and primarily applying the electrode slurry on the collector to form a first coating layer; an intermediate pressing part disposed on the intermediate die and pressing the first coating layer to expand a width of the first coating layer so as to adjust a thickness of the first coating layer; a second discharge part disposed between the intermediate die and the upper die and secondarily applying the electrode slurry on a surface of the first coating layer that is adjusted in thickness to form a second coating layer; and an upper pressing part disposed on the upper die and pressing the first coating layer and the second coating layer, which are stacked, at the same time to expand a width of each of the first coating layer and the second coating layer so as to adjust a thickness of each of the first coating layer and the second coating layer, wherein the first discharge part has a width less than that of the second discharge part.

The first discharge part may have a width less by 1 mm to 7 mm than that of the second discharge part.

In an electrode slurry coating apparatus according to a second embodiment of the present invention, an intermediate pressing part may further protrude in a direction of a collector than an upper pressing part.

The intermediate pressing part may further protrude by 0.5 times to 1.5 times of a thickness of the second coating layer in the direction of the collector than the upper pressing part.

A lower pressing part disposed at a front end of the lower die and the intermediate pressing part may have the same height when measured based on the upper pressing part.

In an electrode slurry coating apparatus according to a third embodiment of the present invention, an intermediate pressing part may comprise a first pressing surface adjacent to a lower die and a second pressing surface adjacent an upper die, and the first pressing surface and the lower pressing part may further protrude in a direction of a collector than an upper pressing part.

The first pressing surface and the lower pressing part may have the same height when measured based on the upper pressing part and are disposed with a first discharge part therebetween.

The second pressing surface and the upper pressing part may have the same height when measured based on the upper pressing part and are disposed with a second discharge part therebetween.

A coating method using the electrode slurry coating apparatus according to the first embodiment of the present invention, which comprises a lower die, an intermediate die, and an upper die, may comprise: a step (a) of primarily discharging the electrode slurry through a first discharge part disposed between the lower die and the intermediate die to form a first coating layer on the collector; a step (b) of pressing the first coating layer applied on the collector through an intermediate pressing part disposed on the intermediate die and expanding the first coating layer in a width direction to adjust a thickness of the first coating layer; a step (c) of discharging the electrode slurry through a second discharge part disposed between the intermediate die and the upper die to form a second coating layer to be stacked on a surface of the first coating layer; and a step (d) of pressing the second coating layer through an upper pressing part disposed on the upper die and pressing the first coating layer by the second coating layer to expand widths of the first coating layer and the second coating layer so as to adjust a thickness of each of the first coating layer and the second coating layer, wherein the first discharge part has a width less than that of the second discharge part.

Advantageous Effects

First: The electrode slurry coating apparatus may comprise the lower die, the intermediate die, and the upper die. The first discharge part forming the first coating layer on the collector may be formed between the lower die and the intermediate die, and the intermediate pressing part pressing the first coating layer may be formed on the intermediate die. The second discharge part forming the second coating layer to be stacked on the first coating layer between the intermediate die and the upper die, and the upper pressing part pressing the staked first and second coating layers at the same time may be formed on the upper die. The second discharge part may be formed so that the first discharge part has a width less than that of the second discharge part. Therefore, the first coating layer applied on the collector may have a width greater than that of the second coating layer applied on the first coating layer. Thus, the first and second coating layers applied to be multilayered on the collector may have the same thickness to significantly prevent the defects from occurring, thereby significantly improving the yield of the electrode. That is, the first coating layer may be pressed twice by the intermediate pressing part and the upper pressing part to increase in width twice, and the second coating layer may be pressed once by the upper pressing part to increase in width once. Thus, as the second coating layer is formed by the width of the first coating layer, which increases by the intermediate pressing part, the widths of the first and second coating layers may be adjusted to match each other.

Second: In the electrode slurry coating apparatus of the present invention, the first discharge part may have a width less by 1 mm to 7 mm than that of the second discharge part. Therefore, the widths of the first coating part and the second discharge part, which are applied to be multilayered on the collector may be adjusted to match each other to significantly prevent the defects from occurring.

Third: In the electrode slurry coating apparatus of the present invention, the intermediate pressing part may further protrude toward the collector than the upper pressing part. Therefore, the first coating part applied on the collector may be stably pressed through the first discharge part to expand the first coating part in the width direction, thereby uniformly adjusting the thicknesses.

Fourth: In the electrode slurry coating apparatus of the present invention, the lower pressing part of the intermediate pressing part of the lower die may have the same height when measured based on the upper pressing part. Therefore, the electrode slurry discharged through the first discharge part formed between the lower die and the upper die may be induced so as not be spread but be stably applied on the surface of the collector. As a result, the first coating layer applied on the collector may have the uniform thickness.

Fifth: In the electrode slurry coating apparatus of the present invention, the intermediate pressing part may comprise the first pressing surface adjacent to the lower die and the second pressing surface adjacent to the upper die. The first pressing surface and the lower pressing part may have the same height, and the second pressing surface and the upper pressing part may have the same height. Therefore, the first coating layer and the coating layer, which are applied on the collector, may be prevented from being spread, and thus, the first coating layer and the second coating layer may have the uniform thickness.

BRIEF DESCRIPTION OF THE DRAWINGS

FIG. 5 is a table showing an experimental example of the electrode slurry coating apparatus according to the first embodiment of the present invention.

MODE FOR CARRYING OUT THE INVENTION

Figure 1:
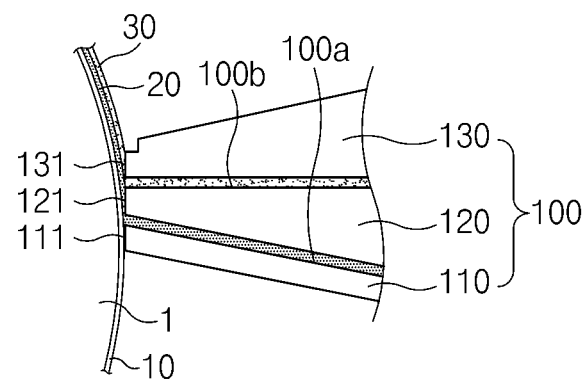
FIG. 1 is a side view of an electrode slurry coating apparatus according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode]

Referring to FIG. 1, an electrode of the present invention comprises a collector 10 and a coating part applied on a surface of the collector 10. The coating part comprises a first coating layer 20 applied on a surface of the collector 10 and a second coating layer 30 applied to be stacked on a surface of the first coating layer 20.

Here, the first coating layer 20 and the second coating layer 30 are applied through an electrode slurry coating apparatus according to the present invention.

That is, the electrode slurry coating apparatus according to the present invention may apply each of the first coating layer 20 and the second coating layer 30 on the surface of the collector 10 that is transferred along an outer surface of a transfer roller 1 and then press the first and second coating layers 20 and 30. Thus, the first coating layer 20 and the second coating layer 30, which have the same width, may be formed on the surface of the collector 10.

Hereinafter, the electrode slurry coating apparatus of the present invention will be described in more detail with reference to embodiments.

[Electrode Slurry Coating Apparatus According to First Embodiment of the Present Invention]

Figure 2:
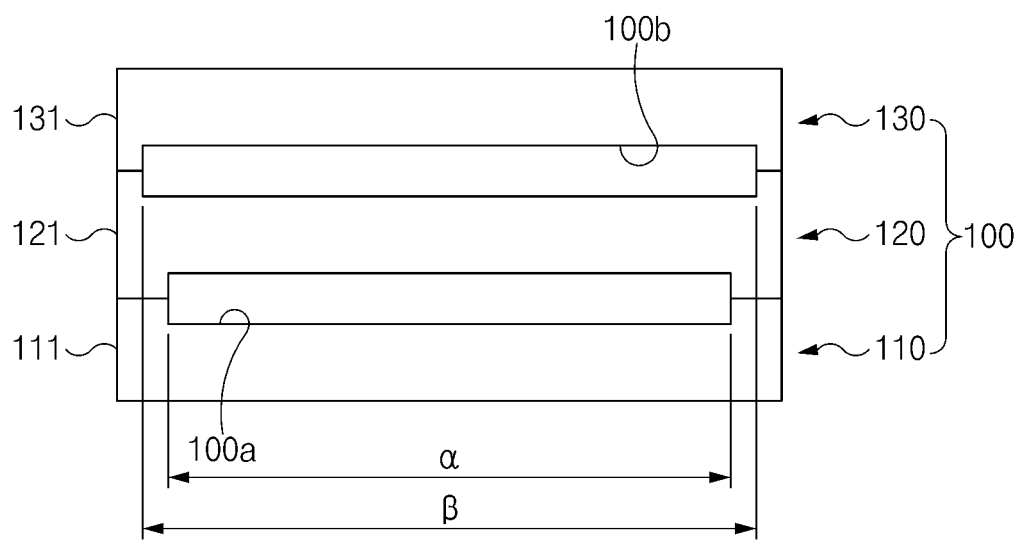
FIG. 2 is a front view of the electrode slurry coating apparatus according to the first embodiment of the present invention.
Figure 3:
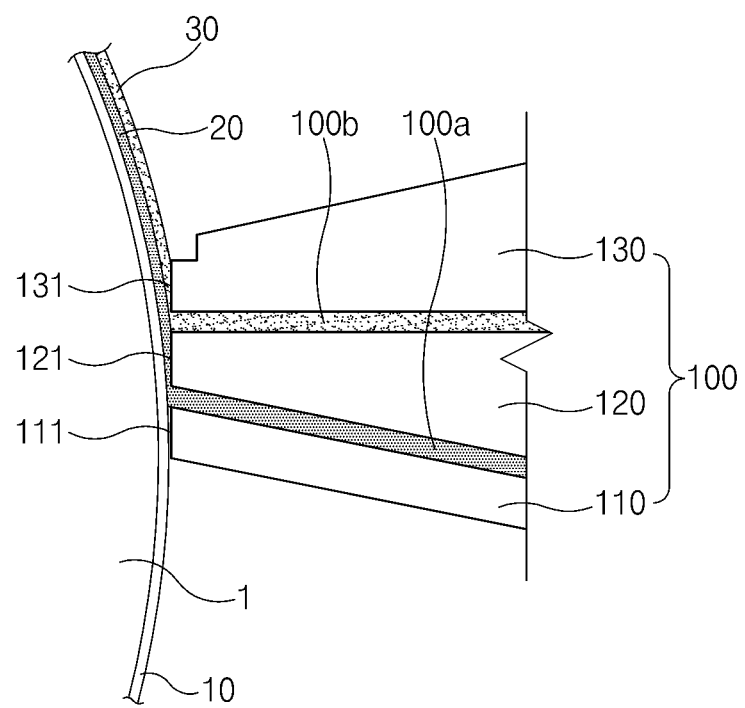
FIG. 3 is a partial enlarged view of FIG. 1.

As illustrated in FIGS. 1 to 3, an electrode slurry coating apparatus 100 according to a first embodiment of the present invention comprises a lower die 110 applying slurry on a collector 10, an intermediate die 120, and an upper die 130.

That is, referring to FIG. 1, the electrode slurry coating apparatus 100 according to the first embodiment of the present invention has a structure in which the lower die 110, the intermediate die 120, and the upper die 130 are sequentially provided upward.

Also, the electrode slurry coating apparatus 100 according to the first embodiment of the present invention comprises a first discharge part 100a disposed between the lower die 110 and the intermediate die 120 and primarily applying the electrode slurry on the collector 10 to form a first coating layer 20, an intermediate pressing part 121 disposed on the intermediate die 120 and pressing the first coating layer 20 to expand a width of the first coating layer 20 so as to adjust a thickness of the first coating layer 20, a second discharge part 100b disposed between the intermediate die 120 and the upper die 130 and secondarily applying the electrode slurry on a surface of the first coating layer 20 that is adjusted in thickness to form a second coating layer 30, and an upper pressing part 131 disposed on the upper die 130 and pressing the first coating layer 20 and the second coating layer 30, which are stacked, at the same time to expand a width of each of the first coating layer 20 and the second coating layer 30 so as to adjust a thickness of each of the first coating layer 20 and the second coating layer 30.

Here, in the electrode slurry coating apparatus 100 according to the first embodiment of the present invention, the first discharge part 100a may have a width less than that of the second discharge part 100b.

That is, when the first discharge part 100a and the second discharge part 100b have the same width, the first coating layer 20 may be pressed twice by the intermediate pressing part 121 and the upper pressing part 131 to increase in width twice, and the second coating layer 30 may be pressed once by the upper pressing part 131 to increase in width once. Thus, the first coating layer 20 formed on the collector 10 may be applied at a width greater than that of the second coating layer 30.

To prevent this phenomenon, in the electrode slurry coating apparatus 100 according to the first embodiment of the present invention, as illustrated in FIG. 2, the first discharge part 100a may have a width less than that of the second discharge part 100b. Thus, the second coating part 30 applied by the second discharge part 100b may have a width greater than that of the first coating part 20 applied by the first discharge part 100a. As a result, the width of the first coating layer 20 that is pressed twice and the width of the second coating layer that is pressed once may be adjusted to match each other to prevent coating defects from occurring.

For example, as illustrated in FIG. 2, the first discharge part 100a may have a width a that is less by 1 mm to 7 mm than that β of the second discharge part 100b.

As described above, the electrode slurry coating apparatus 100 according to the first embodiment of the present invention may have the feature in which the first discharge part 100a has a width less than that of the second discharge part 100b. Due to this feature, the widths of the first and second coating layers 20 and 30, which are applied on the collector 10, may be effectively adjusted to match each other to significantly prevent the defects from occurring and improve yield.

Hereinafter, a coating method using the electrode slurry coating apparatus according to the first embodiment of the present invention will be described.

[Electrode Slurry Coating Method According to First Embodiment of the Present Invention]

Figure 4:
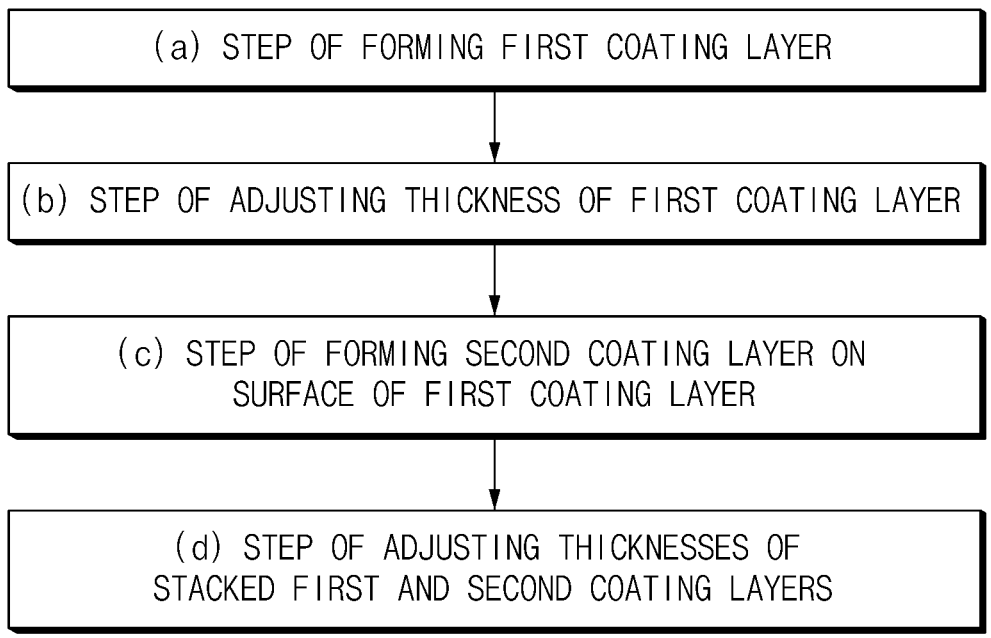
FIG. 4 is a flowchart illustrating an electrode slurry coating method according to the first embodiment of the present invention.

As illustrated in FIG. 4, an electrode slurry coating method according to the first embodiment of the present invention is performed to apply electrode slurry on a collector through an electrode slurry coating apparatus comprising a lower die, an intermediate die, and an upper die and comprises a step (a) of forming a first coating layer on the collector, a step (b) of adjusting a thickness of the first coating layer, a step (c) of forming a second coating layer to be staked on a surface of the first coating layer, and a step (d) of adjusting thicknesses of the first coating layer and the second coating layer at the same time.

In the step (a), the electrode slurry is primarily discharged through a first discharge part 100a disposed between the lower die 110 and the intermediate die 120 to form the first coating layer 20 on the collector 10.

In the step (b), the first coating layer 20 applied on the collector 10 is pressed through an intermediate pressing part 121 disposed on the intermediate die 120 and expanding the first coating layer 20 in a width direction to adjust the thickness of the first coating layer 20.

In the step (c), the electrode slurry is discharged through a second discharge part 100b disposed between the intermediate die 120 and the upper die 130 to form a second coating layer 30 to be stacked on a surface of the first coating layer 20.

Here, the first discharge part 100a may have a width less than that of the second discharge part 100b. Thus, the second coating layer 30 applied by the second discharge part 100b may have a width greater than that of the first coating layer 20 applied by the first discharge part 100a. However, the first coating layer 20 may be pressed by the intermediate pressing part 121 so as to be expanded in width. Thus, the first coating layer 20 and the second coating layer 30 may be formed to be stacked at the same width.

In the step (d), while the second coating layer 30 is pressed through an upper pressing part 131 disposed on the upper die 130, and the first coating layer 20 is pressed by the second coating layer 30, the first coating layer 20 and the second coating layer 30 are expanded in width at the same time. Thus, the first coating layer 20 and the second coating layer 30, which have the same width, may be adjusted in thickness.

Hereinafter, experimental examples of the electrode slurry coating apparatus according to an embodiment of the present invention will be described.

EXPERIMENTAL EXAMPLE 1

When an electrode is manufactured in a state in which first and second discharge parts 100a and 100b of the electrode slurry coating apparatus according to the first embodiment of the present invention have widths different from each other, results as illustrated in FIG. 5 were obtained.

Experiment 1: when an electrode is manufactured in a state in which the first discharge part 100a has a discharge width of 220 mm, and the second discharge part 100b has a discharge width of 220 mm, the first coating layer 20 applied on the collector 10 has a width 223 mm, and the second coating layer 30 has a width of 226 mm. That is, it is seen that the first coating layer 20 and the second coating layer 30 has an error of 3 mm therebetween.

Experiment 2: when an electrode is manufactured in a state in which the first discharge part 100a has a discharge width of 221 mm, and the second discharge part 100b has a discharge width of 220 mm, the first coating layer 20 applied on the collector 10 has a width 224 mm, and the second coating layer 30 has a width of 226 mm. That is, it is seen that the first coating layer 20 and the second coating layer 30 has an error of 2 mm therebetween.

Experiment 3: when an electrode is manufactured in a state in which the first discharge part 100a has a discharge width of 221 mm, and the second discharge part 100b has a discharge width of 219 mm, the first coating layer 20 applied on the collector 10 has a width 224 mm, and the second coating layer 30 has a width of 225 mm. That is, it is seen that the first coating layer 20 and the second coating layer 30 has an error of 1 mm therebetween.

Experiment 4: when an electrode is manufactured in a state in which the first discharge part 100a has a discharge width of 221 mm, and the second discharge part 100b has a discharge width of 218 mm, the first coating layer 20 applied on the collector 10 has a width 224 mm, and the second coating layer 30 has a width of 224 mm. That is, it is seen that the first coating layer 20 and the second coating layer 30 has no error therebetween.

Thus, according to the experimental results as described above, when the first discharge part 100a has the discharge width of 221 mm, and the second discharge part 100b has the discharge width of 218 mm through the electrode slurry coating apparatus 100 according to the first embodiment of the present invention, it is seen than the widths of the first coating layer 20 and the second coating layer 30 are adjusted to match each other.

EXPERIMENTAL EXAMPLE 2

Figure 6:
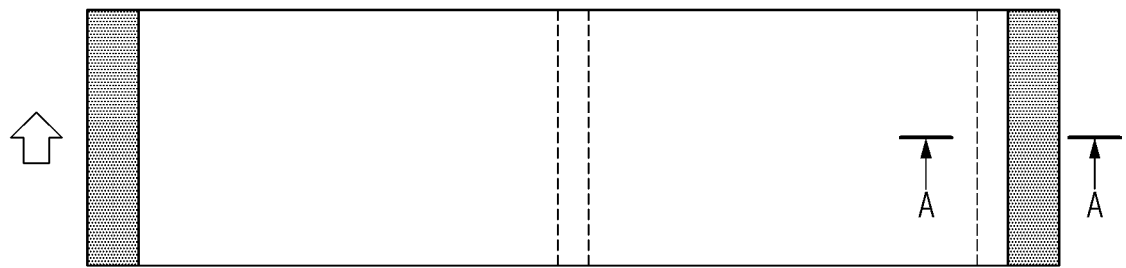
FIG. 6 is a plan view of an electrode manufactured by the electrode slurry coating method according to the first embodiment of the present invention.
Figure 7:
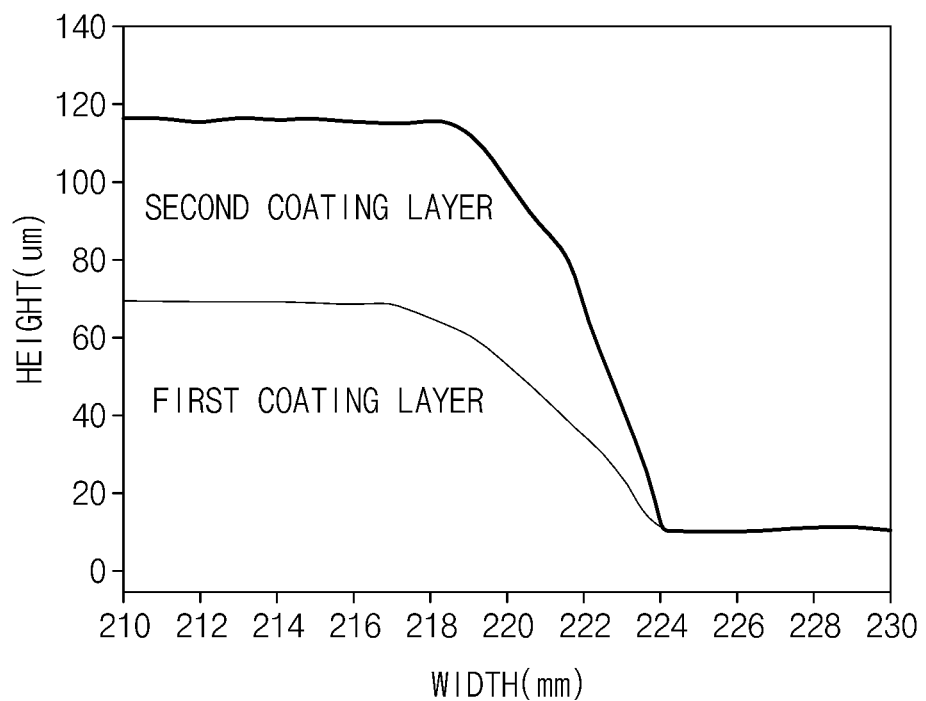
FIG. 7 is a graph illustrating a cross-section taken along line A-A of FIG. 6.

The electrode manufactured by the above-described experiment 4 comprises the collector 10 and a coating part provided with the first and second coating layers 20 and 30 as illustrated in FIGS. 6 and 7.

Here, when the coating part provided with the first and second coating layers 20 and 30 is cut, as illustrated in FIG. 7, it is seen that ends of the first and second coating layers 20 and 30 match each other at a point of 224 mm.

Hereinafter, in descriptions of another embodiment of the present invention, constituents having the same function as the abovementioned embodiment have been given the same reference numeral in the drawings, and thus duplicated description will be omitted.

[Electrode Slurry Coating Apparatus According to Second Embodiment of the Present Invention]

Figure 8:
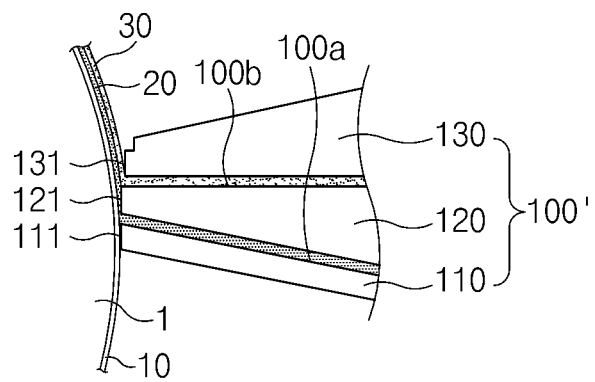
FIG. 8 is a side view of an electrode slurry coating apparatus according to a second embodiment of the present invention.

As illustrated in FIG. 8, in an electrode slurry coating apparatus 100' according to a second embodiment of the present invention, an intermediate pressing part 121 may further protrude in a direction of a collector 10 than an upper pressing part 131. That is, the intermediate pressing part 121 may press only a first coating layer 20 applied on the collector 10, and the upper pressing part 131 may press the first and second coating layers 20 and 30, which are stacked to be multilayered, at the same time. Thus, the intermediate pressing part 121 further protrudes toward the collector than the upper pressing part 131, the first coating layer may be more stably pressed.

Particularly, the intermediate pressing part 121 may further protrude by 0.5 times to 1.5 times of a thickness (a thickness to be stacked) of the second coating layer 30 in the direction of the collector 10 than the upper pressing part 131. That is, when the intermediate pressing part 121 protrudes by 0.5 times or less of the thickness (the thickness to be stacked) of the second coating layer 30 in the direction of the collector 10 than the upper pressing part 131, the first coating layer 20 may not be stably pressed, and thus, the thickness of the first coating layer may not be uniformly adjusted. When the intermediate pressing part 121 protrudes by 1.5 times or more of the thickness (the thickness to be stacked) of the second coating layer 30 in the direction of the collector 10 than the upper pressing part 131, the first coating layer may be excessively pressed to largely increase in width of the first coating layer 20, thereby causing coating defects. Thus, the intermediate pressing part 121 may further protrude by 0.5 times to 1.5 times of a thickness (a thickness to be stacked) of the second coating layer 30 in the direction of the collector 10 than the upper pressing part 131 to stably press the second coating layer 20 and also prevent the coating defects from occurring.

A lower pressing part 111 disposed at a front end of a lower die 110 and the intermediate pressing part 121 may have the same height when measured based on the upper pressing part 131. That is, the lower pressing part 111 and the intermediate pressing part 121 may have the same horizontal surface. Thus, electrode slurry applied through a first discharge part 100a formed between the lower pressing part 111 and the intermediate pressing part 121 may be vertically discharged toward the collector 10. As a result, the first coating layer applied on the collector 10 may be more uniformly adjusted in thickness.

[Electrode Slurry Coating Apparatus According to Third Embodiment of the Present Invention]

Figure 9:
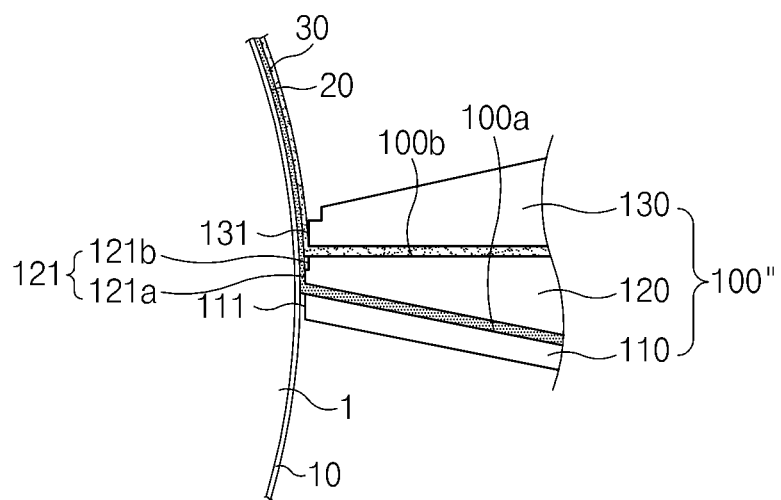
FIG. 9 is a front view of an electrode slurry coating apparatus according to a third embodiment of the present invention.
Figure 10:
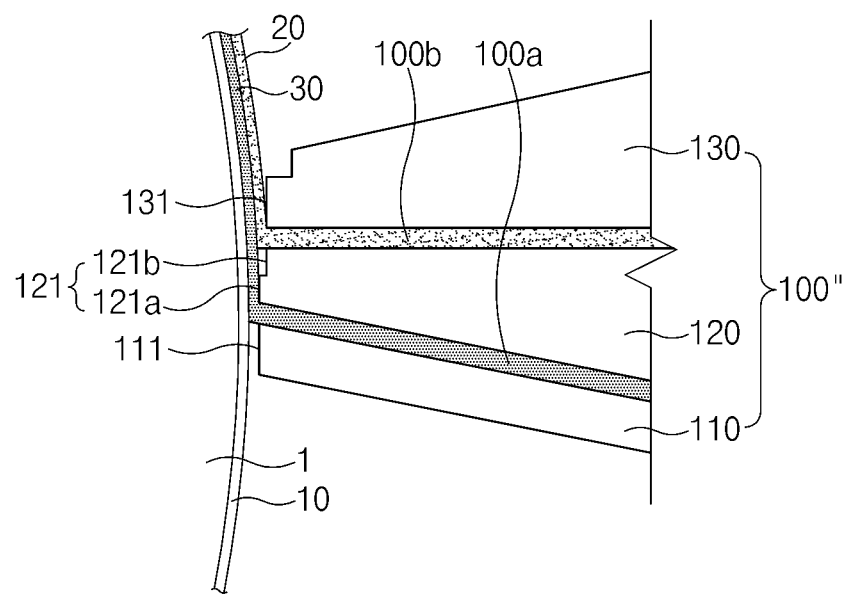
FIG. 10 is a partial enlarged view of FIG. 9.

As illustrated in FIGS. 9 and 10, in an electrode slurry coating apparatus 100" according to a third embodiment of the present invention, an intermediate pressing part 121 comprises a first pressing surface 121a adjacent to a lower die 110 and a second pressing surface adjacent an upper die 130. The first pressing surface 121a and the lower pressing part 111 may further protrude in a direction of a collector 10 than an upper pressing part 131.

Particularly, the first pressing surface 121a and the lower pressing part 111 may have the same height when measured based on the upper pressing part 131 and be disposed with a first discharge part 100a therebetween. Also, the second pressing surface 121b and the upper pressing part 131 may have the same height when measured based on the lower pressing part 111 and be disposed with a second discharge part 100b therebetween.

Thus, the electrode slurry coating apparatus according to the third embodiment of the present invention may induce electrode slurry so that the electrode slurry is applied on the collector 10 while minimizing spreading of the electrode slurry discharged through the first discharge part 100a and the second discharge part 100b. Thus, a first coating layer 20 applied on the collector 10 and a second coating layer applied to a surface of the first coating layer 20 may be more uniformly formed in thickness. Particularly, the first coating layer 20 applied on the collector 10 may be stably pressed through the first pressing surface 121a, and thus, the first coating layer 20 may be uniformly adjusted in thickness.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode slurry coating apparatus comprising:
a lower die configured to apply an electrode slurry on a collector;
an intermediate die;
an upper die;
a first discharge part disposed between the lower die and the intermediate die and configured to primarily apply the electrode slurry on the collector to form a first coating layer;
an intermediate pressing part disposed on the intermediate die and configured to press the first coating layer to expand a width of the first coating layer so as to adjust a thickness of the first coating layer;
a second discharge part disposed between the intermediate die and the upper die and configured to secondarily apply the electrode slurry on a surface of the first coating layer that is adjusted in thickness, to form a second coating layer; and
an upper pressing part disposed on the upper die and configured to press the first coating layer and the second coating layer, which are stacked, at the same time to expand a width of each of the first coating layer and the second coating layer so as to adjust a thickness of each of the first coating layer and the second coating layer,
wherein the first discharge part has a width less than that of the second discharge part, and
wherein the width is a dimension perpendicular to a moving direction of the collector, in a same plane as the collector.

2. The electrode slurry coating apparatus of claim 1, wherein the first discharge part has a width less by 1 mm to 7 mm than that of the second discharge part.

3. The electrode slurry coating apparatus of claim 1, wherein the intermediate pressing part protrudes further in a direction of the collector than the upper pressing part.

4. The electrode slurry coating apparatus of claim 3, wherein the intermediate pressing part protrudes further by 0.5 times to 1.5 times of a thickness of the second coating layer in the direction of the collector than the upper pressing part.

5. The electrode slurry coating apparatus of claim 3, wherein a lower pressing part disposed at a front end of the lower die and the intermediate pressing part each have an equal height when measured based on the upper pressing part.

6. The electrode slurry coating apparatus of claim 1, wherein the intermediate pressing part comprises a first pressing surface adjacent to the lower die and a second pressing surface adjacent the upper die, and the first pressing surface and the lower pressing part protrude further in a direction of the collector than the upper pressing part.

7. The electrode slurry coating apparatus of claim 6, wherein the first pressing surface and the lower pressing part each have an equal height when measured based on the upper pressing part and are disposed with the first discharge part therebetween.

8. The electrode slurry coating apparatus of claim 6, wherein the second pressing surface and the upper pressing part each have an equal height when measured based on the upper pressing part and are disposed with the second discharge part therebetween.

9. A slurry coating method for applying electrode slurry on a collector, through an electrode slurry coating apparatus comprising a lower die, an intermediate die, and an upper die, the electrode slurry coating method comprising:
primarily discharging the electrode slurry through a first discharge part disposed between the lower die and the intermediate die to form a first coating layer on the collector;
pressing the first coating layer applied on the collector through an intermediate pressing part disposed on the intermediate die and expanding the first coating layer in a width direction to adjust a thickness of the first coating layer;
discharging the electrode slurry through a second discharge part disposed between the intermediate die and the upper die to form a second coating layer to be stacked on a surface of the first coating layer; and
pressing the second coating layer through an upper pressing part disposed on the upper die and pressing the first coating layer by the second coating layer to expand widths of the first coating layer and the second coating layer so as to adjust a thickness of each of the first coating layer and the second coating layer,
wherein the first discharge part has a width less than that of the second discharge part, and
wherein the width is a dimension perpendicular to a moving direction of the collector, in a same plane as the collector.

10. The electrode slurry coating method of claim 9, wherein the first discharge part has a width less by 1 mm to 7 mm than that of the second discharge part.

11. The electrode slurry coating method of claim 9, wherein the intermediate pressing part protrudes further in a direction of the collector than the upper pressing part.

12. The electrode slurry coating method of claim 9, wherein a lower pressing part disposed at a front end of the lower die and the intermediate pressing part each have an equal height when measured based on the upper pressing part.

* * * * *